(12) United States Patent
Huppi et al.

(10) Patent No.: US 9,772,721 B2
(45) Date of Patent: Sep. 26, 2017

(54) ULTRASOUND-BASED FORCE SENSING AND TOUCH SENSING

(71) Applicant: Apple Inc., Cupertino, CA (US)

(72) Inventors: Brian Q. Huppi, Cupertino, CA (US);
Martin P. Grunthaner, Cupertino, CA (US); John G. Elias, Cupertino, CA (US); Sinan Filiz, Cupertino, CA (US); Steven P. Hotelling, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/730,370

(22) Filed: Jun. 4, 2015

(65) Prior Publication Data

US 2016/0062497 A1    Mar. 3, 2016

Related U.S. Application Data

(63) Continuation of application No. 14/417,324, filed as application No. PCT/US2013/032478 on Mar. 15, 2013, now abandoned.
(Continued)

(51) Int. Cl.
*G06F 3/043* (2006.01)
*G06F 3/041* (2006.01)
(Continued)

(52) U.S. Cl.
CPC .............. *G06F 3/043* (2013.01); *G06F 3/044* (2013.01); *G06F 3/0414* (2013.01);
(Continued)

(58) Field of Classification Search
None
See application file for complete search history.

(56) References Cited

U.S. PATENT DOCUMENTS

| 4,526,043 A | 7/1985 | Boie et al. |
| 4,964,302 A | 10/1990 | Grahn et al. |

(Continued)

FOREIGN PATENT DOCUMENTS

| CN | 1740958 | 3/2006 |
| CN | 101458606 | 6/2009 |

(Continued)

OTHER PUBLICATIONS

Bau, et al., "TeslaTouch: Electrovibration for Touch Surfaces," UIST'10, Oct. 3-6, 2010, New York, New York USA, 10 pages.
(Continued)

*Primary Examiner* — Ifedayo Iluyomade
(74) *Attorney, Agent, or Firm* — Brownstein Hyatt Farber Schreck, LLP

(57) ABSTRACT

An input/output device for a computing device including one or more touch sensors and one or more force sensors. The touch sensors sense data including one or more locations at which a contact or near-contact occurs. The force sensor sense data including a measure of an amount of force presented at the one or more locations at which a contact occurs. The touch sensors and the force sensors responsive to signals occurring in response to whether the signals are in response to contact or in response to an amount of force. The input/output device also includes one or more circuits coupled to the touch sensors and to the force sensors, and capable of combining information from both sensors.

20 Claims, 12 Drawing Sheets

Related U.S. Application Data

(60) Provisional application No. 61/676,297, filed on Jul. 26, 2012.

(51) Int. Cl.
*G06F 3/044* (2006.01)
*G06F 3/0488* (2013.01)

(52) U.S. Cl.
CPC ............... *G06F 3/04883* (2013.01); *G06F 2203/04104* (2013.01); *G06F 2203/04106* (2013.01); *G06F 2203/04808* (2013.01)

(56) References Cited

U.S. PATENT DOCUMENTS

| | | |
|---|---|---|
| 5,209,126 A | 5/1993 | Grahn |
| 5,673,041 A | 9/1997 | Chatigny et al. |
| 5,854,450 A | 12/1998 | Kent |
| 6,888,536 B2 | 5/2005 | Westerman et al. |
| 7,331,245 B2 | 2/2008 | Nishimura et al. |
| 7,629,966 B2 | 12/2009 | Anson |
| 8,169,332 B2 | 5/2012 | Son |
| 8,289,290 B2 | 10/2012 | Klinghult |
| 8,423,089 B2 | 4/2013 | Song et al. |
| 8,471,824 B2 | 6/2013 | Kim et al. |
| 8,570,162 B2 | 10/2013 | Ujii et al. |
| 8,570,297 B2 | 10/2013 | Bulea et al. |
| 8,633,916 B2 | 1/2014 | Bernstein et al. |
| 8,648,816 B2 | 2/2014 | Homma et al. |
| 8,674,947 B2 | 3/2014 | Henderson et al. |
| 8,711,122 B2 | 4/2014 | Wada et al. |
| 8,711,128 B2 | 4/2014 | Small et al. |
| 8,730,199 B2 | 5/2014 | Sleeman et al. |
| 8,803,848 B2 | 8/2014 | Suarez Rovere |
| 9,024,886 B2 | 5/2015 | Doi et al. |
| 9,024,907 B2 | 5/2015 | Bolender |
| 9,063,593 B2 | 6/2015 | Schneider et al. |
| 9,127,999 B2 | 9/2015 | Tsuruno |
| 9,262,002 B2 | 2/2016 | Momeyer et al. |
| 2001/0023204 A1 | 9/2001 | Komata |
| 2006/0244733 A1 | 11/2006 | Geaghan |
| 2008/0185281 A1 | 8/2008 | Chang et al. |
| 2008/0198145 A1 | 8/2008 | Knowles et al. |
| 2009/0019949 A1 | 1/2009 | Rothkopf et al. |
| 2009/0160808 A1 | 6/2009 | Wu et al. |
| 2009/0228791 A1 | 9/2009 | Kim et al. |
| 2010/0066697 A1 | 3/2010 | Jacomet et al. |
| 2010/0079382 A1 | 4/2010 | Suggs |
| 2010/0123686 A1 | 5/2010 | Klinghult et al. |
| 2011/0012760 A1 | 1/2011 | Klinghult |
| 2011/0095919 A1 | 4/2011 | Ostermoeller et al. |
| 2011/0141052 A1* | 6/2011 | Bernstein ............... G06F 3/016 345/174 |
| 2011/0199342 A1* | 8/2011 | Vartanian ............... G06F 3/016 345/177 |
| 2011/0254762 A1 | 10/2011 | Dahl et al. |
| 2012/0086666 A1 | 4/2012 | Badaye et al. |
| 2012/0174672 A1* | 7/2012 | Tsuruno ............... B25J 13/083 73/627 |

FOREIGN PATENT DOCUMENTS

| | | |
|---|---|---|
| EP | 1840715 | 10/2007 |
| EP | 2141566 | 1/2010 |
| WO | WO 2011/024457 | 3/2011 |

OTHER PUBLICATIONS

Feist, "Samsung snags patent for new pressure sensitive touch-screens," posted on AndroidAuthority.com at URL: http://www.androidauthority.com/samsung-patent-pressure-sensitive-touch-screens-354860, Mar. 7, 2014, 1 page.

Bantz, "Keyboard Device for Upper and Lower Case Keying Without Shifting," IBM Technical Disclosure Bulletin, International Business Machines Corp. (Thornwood, vol. 21, No. 9, 1979, pp. 3845-3846.

* cited by examiner

ULTRASOUND-BASED FORCE SENSING AND TOUCH SENSING

CROSS REFERENCE TO RELATED APPLICATIONS

This application is a continuation of U.S. patent application Ser. No. 14/417,324, filed on Jan. 26, 2015, and entitled "Ultrasound-Based Force Sensing and Touch Sensing," which application is a 35 U.S.C. §371 application of PCT/US2013/032478, which was filed on Mar. 15, 2013, and entitled "Ultrasound-Based Force Sensing and Touch Sensing," and further claims the benefit under 35 U.S.C. §119(e) to U.S. provisional application No. 61/676,297, filed Jul. 26, 2012, and entitled, "Ultrasound-Based Force Sensing and Touch Sensing," all of which are incorporated by reference as if fully disclosed herein.

BACKGROUND

Field of the Disclosure

This application generally relates to force sensing on touch devices using ultrasound.

Background of the Disclosure

Touch devices generally provide for identification of positions where the user touches the device, including movement, gestures, and other effects of position detection. For a first example, touch devices can provide information to a computing system regarding user interaction with a graphical user interface (GUI), such as pointing to elements, reorienting or repositioning those elements, editing or typing, and other GUI features. For a second example, touch devices can provide information to a computing system suitable for a user to interact with an application program, such as relating to input or manipulation of animation, photographs, pictures, slide presentations, sound, text, other audiovisual elements, and otherwise.

It sometimes occurs that, when interfacing with a GUI, or with an application program, it would be advantageous for the user to be able to indicate an amount of force applied when manipulating, moving, pointing to, touching, or otherwise interacting with, a touch device. For example, it might be advantageous for the user to be able to manipulate a screen element or other object in a first way with a relatively lighter touch, or in a second way with a relatively more forceful or sharper touch. In one such case, a it might be advantageous if the user could move a screen element or other object with a relatively lighter touch, while the user could alternatively invoke or select that same screen element or other object with a relatively more forceful or sharper touch.

It also sometimes occurs that, when interfacing with a GUI, or with an application program, it would be advantageous for the GUI or application program to be able to determine an identity of the user, or an affect thereof, in response to a degree of force applied by the user when using the touch device. For example, it might occur that a first user and a second user differ in detectable ways with respect to how much force they apply, or when they apply that force, when using that GUI or application program.

Each of these examples, as well as other possible considerations, can cause one or more difficulties for the touch device, at least in that inability to determine an amount of force applied by the user when contacting the touch device might cause a GUI or an application program to be unable to provide functions that would be advantageous. When such functions are called for, inability to provide those functions may subject the touch device to lesser capabilities, to the possible document of the effectiveness and value of the touch device.

BRIEF SUMMARY OF THE DISCLOSURE

This application provides techniques, including circuits and designs, which can determine an amount of force applied, and changes in amounts of force applied, by the user when contacting a touch pad, and which can be incorporated into devices using touch recognition, touch elements of a GUI, and touch input or manipulation in an application program. This application also provides techniques, including devices which apply those techniques, which can determine an amount of force applied, and changes in amounts of force applied, by the user when contacting a touch pad, and in response thereto, provide additional functions available to a user of a touch pad.

In one embodiment, techniques can include providing a force sensitive sensor incorporated into a touch device. For example, a force sensitive sensor can include an ultrasound device which can detect a measure of how forcefully a user is pressing, pushing, or otherwise contacting a touch device.

In one embodiment, the force sensitive sensor operates independently of a second modality that determines one or more locations where the user is contacting the touch device, such as a capacitive touch sensor or other touch sensor. For example, a capacitive touch sensor can determine approximately in what location the user is contacting the touch device, while an ultrasound device can detect how forcefully the user is contacting the touch device.

In one embodiment, the force sensitive sensor includes one or more rows and one or more columns, the rows and columns being disposed to intersect in a set of individual force sense elements. For example, the individual force sense elements can be located in a substantially rectilinear array, with the rows disposed to define the individual rows of that rectilinear array, the columns disposed to define the individual columns of that rectilinear array, and the intersections of the rows and columns disposed to define the individual elements of that rectilinear array.

In one embodiment, the rows and columns can be disposed so that each row is controlled by a drive signal, each column is sensed by a sense circuit, and the intersections between each row and each column are disposed to generate and receive ultrasonic signals. For example the ultrasonic signals can include, first, an ultrasound wave which is directed at a possible position where the user might apply force to the touch screen, and second, an ultrasound wave which is reflected from that position where the user actually does apply force to the touch screen. In one embodiment, techniques can include providing a touch sensitive sensor, in addition to the force sensitive sensor, which can determine a location where the user is actually touching the touch screen. For example, the touch sensitive sensor can include a capacitive sensor, which can determine a location of the user's touch (such as by the user's finger, another part of the user's body, or a stylus or other object).

In alternative embodiments, the force sensitive sensor can include a set of force sensors disposed in an arrangement other than a set of rows and columns disposed to intersect in a set of individual force sense elements. For a first example, the force sensitive sensor can include a set of individual sensor elements whose operation is not necessarily due to intersection of rows and columns. For a second example, the force sensitive sensor can include a set of individual sensor elements disposed in an array or other pattern, which might include a rectilinear pattern or another pattern.

In alternative embodiments, the force sensitive sensor can include a set of individual sensor elements which are disposed in a pattern that allows force of touch to be detected, as to both location and amount, by multiple individual sensor elements operating in concert. A set of individual sensor elements can be each disposed to determine force of touch at a relative distance, and operate in conjunction so as to determine location and amount of that force of touch.

In one embodiment, the touch sensitive sensor and the force sensitive sensor can include separate circuits, components, elements, modules, or otherwise, which can operate in combination or conjunction to separately determine a location of touch and a force-of-touch. For example, a system including the touch panel, an operating system program, an application program, a user interface, or otherwise, can be responsive to the location of touch, the force-of-touch, a combination or conjunction of the two, or other factors.

One sample embodiment may take the form of a touch input/output (I/O) device, including: one or more touch sensors capable of providing touch location information, the touch location information including one or more locations at which a contact or near-contact occurs; one or more force sensors capable of providing force of touch information, the force of touch information including a measure of an amount of force presented at the one or more locations at which a contact or near-contact occurs, wherein the one or more ultrasonic force sensors are separate from the one or more touch sensors; the touch sensors and the force sensors responsive to signals occurring at discernible times, the signals indicative of contact; one or more circuits coupled to the touch sensors and to the ultrasonic force sensors, and capable of combining information from the touch sensors and from the ultrasonic force sensors.

Another sample embodiment may take the form of a method, including operations of providing touch location information in response to one or more touch sensors, the touch location information including one or more locations at which a contact or near-contact occurs; providing force of touch information in response to one or more ultrasonic force sensors, the force of touch information including a measure of an amount of force presented at the one or more locations at which a contact or near-contact occurs; providing the signals at discernible times in response to whether the signals are in response to contact or in response to an amount of force; and combining information from the touch sensors and from the ultrasonic force sensors; wherein the one or more ultrasonic force sensors is discrete from the one or more touch sensors.

For further examples, systems as described above can include the touch sensitive sensor, the force sensitive sensor, as well as other sensors, such as a mouse, trackpad, fingerprint sensor, biometric sensor, voice activation or voice recognition sensor, facial recognition sensor, or otherwise.

While multiple embodiments are disclosed, including variations thereof, still other embodiments of the present disclosure will become apparent to those skilled in the art from the following detailed description, which shows and describes illustrative embodiments of the disclosure. As will be realized, the disclosure is capable of modifications in various obvious aspects, all without departing from the spirit and scope of the present disclosure. Accordingly, the drawings and detailed description are to be regarded as illustrative in nature and not restrictive.

DETAILED DESCRIPTION

Terminology

Figure 1A:
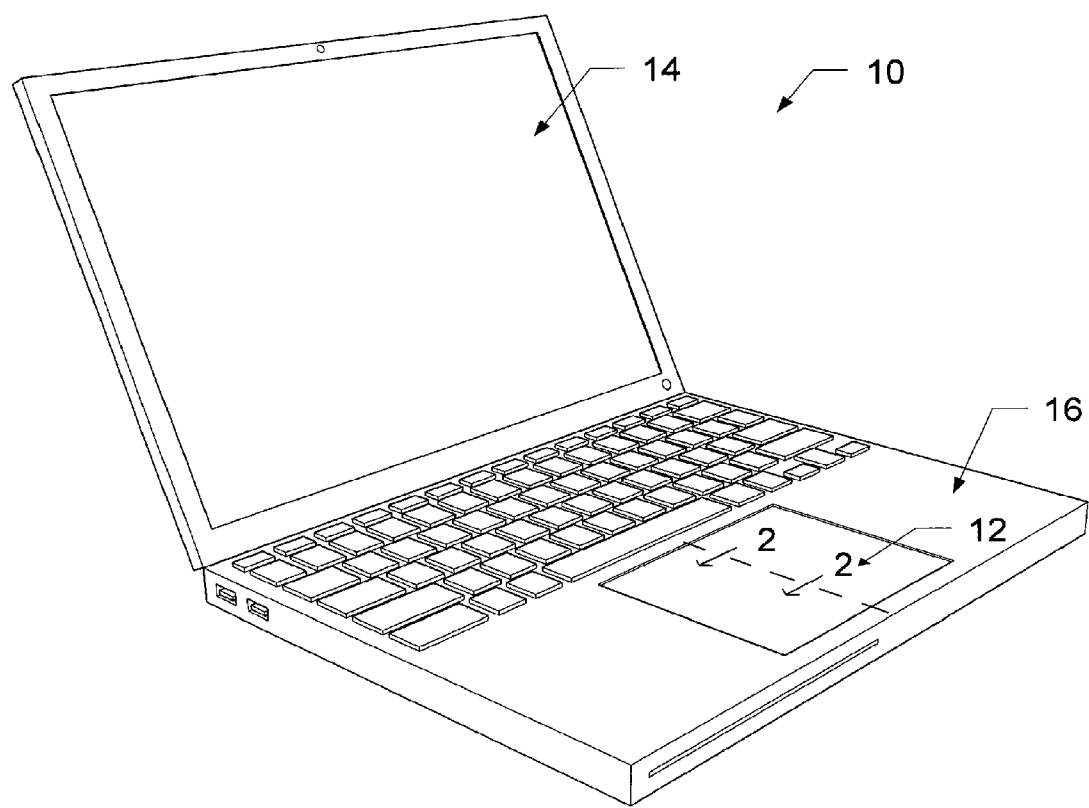
FIG. 1A is a front perspective view of a first example of a computing device incorporating a force sensing device.

The following terminology is exemplary, and not intended to be limiting in any way.

The text "touch sensing element", and variants thereof, generally refers to one or more data sensing elements of any kind, including information sensed with respect to individual locations. For example and without limitation, a touch sensing element can sense data or other information with respect to a relatively small region of where a user is contacting a touch device.

The text "force sensing element", and variants thereof, generally refers to one or more data sensing elements of any kind, including information sensed with respect to force-of-touch, whether at individual locations or otherwise. For example and without limitation, a force sensing element can sense data or other information with respect to a relatively small region of where a user is forcibly contacting a device.

The text "force-of-touch", and variants thereof, generally refers to a degree or measure of an amount of force being applied to a device. The degree or measure of an amount of force need not have any particular scale; for example, the measure of force-of-touch can be linear, logarithmic, or otherwise nonlinear, and can be adjusted periodically (or otherwise, such as aperiodically or otherwise from time to time) in response to one or more factors, either relating to force-of-touch, location of touch, time, or otherwise.

After reading this application, it should be noted that these statements of terminology would be applicable to techniques, methods, physical elements, and systems (whether currently known or otherwise), including extensions thereof inferred or inferable by those skilled in the art after reading this application.

Overview

The present disclosure is generally related to a force sensing device that may be incorporated into a variety of electronic or computing devices, such as, but not limited to, computers, smart phones, tablet computers, track pads, and so on. The force sensing device may be used to detect one or more user force inputs on an input surface and then a processor (or processing element) may correlate the sensed inputs into a force measurement and provide those inputs to the computing device. In some embodiments, the force sensing device may be used to determine force inputs to a track pad, a display screen, or other input surface.

The force sensing device may include an input surface, a force sensing module, a substrate or support layer, and optionally a sensing layer that may detect another input characteristic than the force sensing layer. The input surface provides an engagement surface for a user, such as the external surface of a track pad or the cover glass for a display. In other words, the input surface may receive one or more user inputs directly or indirectly.

The force sensing module may include an ultrasonic module or sensor that may emit and detect ultrasonic pulses. In one example, the ultrasonic module may include a plurality of sensing elements arranged in rows or columns, where each of the sensing elements may selectively emit an ultrasonic pulse or other signal. The pulse may be transmitted through the components of the force sensing device, such as through the sensing layer and the input surface. When the pulse reaches the input surface, it may be reflected by a portion of the user (e.g., finger) or other object, which may reflect the pulse. The reflection of the pulse may vary based on distance that the particular sensing element receiving the pulse is from the input. Additionally, the degree of attenuation of the pulse may also be associated with a force magnitude associated with the input. For example, generally, as the input force on the input surface increases, the contacting object exerting the force may absorb a larger percentage of the pulse, such that the reflected pulse may be diminished correspondingly.

In embodiments where it is present, the sensing layer may be configured to sense characteristics different from the force sensing module. For example, the sensing layer may include capacitive sensors or other sensing elements. In a specific implantation, a multi-touch sensing layer may be incorporated into the force sensing device and may be used to enhance data regarding user inputs. As an example, touch inputs detected by the sense layer may be used to further refine the force input location, confirm the force input location, and/or correlate the force input to an input location. In the last example, the force sensitive device may not use the capacitive sensing of the force sensing device to estimate a location, which may reduce the processing required for the force sensing device. Additionally, in some embodiments, a touch sensitive device may be used to determine force inputs for a number of different touches. For example, the touch positions and force inputs may be used to estimate the input force at each touch location.

Force Sensitive Device and System

Figure 1B:
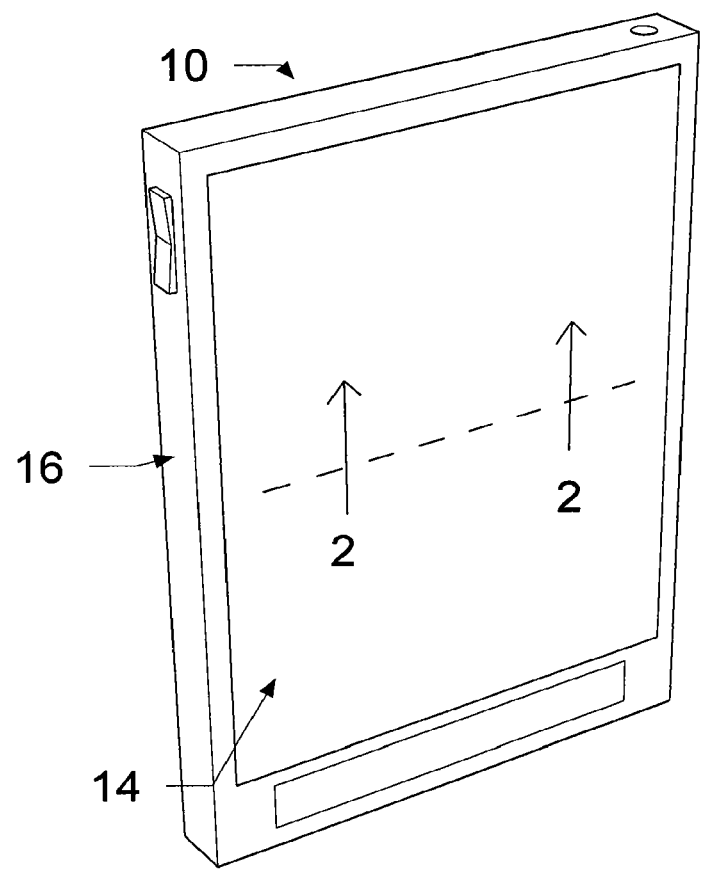
FIG. 1B is a front perspective view of a second example of a computing device incorporating a force sensing device.
Figure 1C:
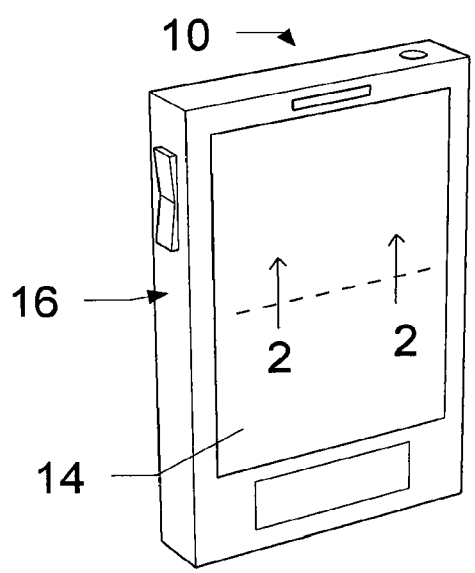
FIG. 1C is a front elevation view of a third example of a computing device incorporating the force sensing device.

Turning now to the figures, illustrative electronic devices that may incorporate the force sensing device will be discussed in more detail. FIGS. 1A-1C illustrate various computing or electronic devices that may incorporate the force sensing device. With reference to FIG. 1A, the force sensing device may be incorporated into a computer 10, such as a laptop or desktop computer. The computer 10 may include a track pad 12 or other input surface, a display 14, and an enclosure 16 or frame. The enclosure 16 may extend around a portion of the track pad 12 and/or display 14. In the embodiment illustrated in FIG. 1A, the force sensing device may be incorporated into the track pad 12, the display 14, or both the track pad 12 and the display 14. In these embodiments, the force sensing device may be configured to detect force inputs to the track pad 12 and/or the display 14.

In some embodiments, the force sensing device may be incorporated into a tablet computer. FIG. 1B is a top perspective view of a tablet computer including the force sensing device. With reference to FIG. 1B, the table computer 10 may include the display 14 where the force sensing device is configured to detect force inputs to the display 14. In addition to the force sensing device, the display 14 may also include one or more touch sensors, such as a multi-touch capacitive grid, or the like. In these embodiments, the display 14 may detect both force inputs, as well as position or touch inputs.

In yet other embodiments, the force sensing device may be incorporated into a mobile computing device, such as a smart phone. FIG. 1C is a perspective view of a smart phone including the force sensing device. With reference to FIG. 1C, the smart phone 10 may include a display 14 and a frame or enclosure 16 substantially surrounding a perimeter of the display 14. In the embodiment illustrated in FIG. 1C, the force sensing device may be incorporated into the display 14. Similarly to the embodiment illustrated in FIG. 1B, in instances where the force sensing device may be incorporated into the display 14, the display 14 may also include one or more position or touch sensing devices in addition to the force sensing device.

Figure 2:
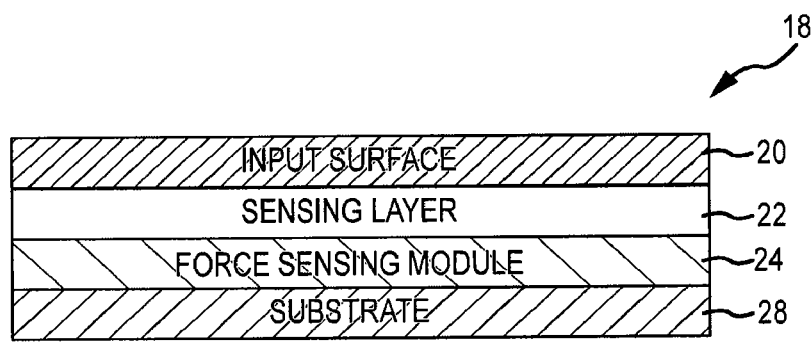
FIG. 2 is a simplified cross-section view of the computing device taken along line 2-2 in FIG. 1A.

The force sensing device will now be discussed in more detail. FIG. 2 is a simplified cross-section view of the electronic device taken along line 2-2 in FIG. 1A. With reference to FIG. 2, the force sensing device 18 may include an input surface 20, a sensing layer 22, a force sensing module 24 or layer, and a substrate 28. As discussed above with respect to FIGS. 1A-1C, the input surface 20 may form an exterior surface (or a surface in communication with an exterior surface) of the track pad 12, the display 14, or other portions (such as the enclosure) of the computing device 10. In some embodiments, the input surface 20 may be at least partially translucent. For example, in embodiments where the force sensing device 18 is incorporated into a portion of the display 14.

The sensing layer 22 may be configured to sense one or more parameters correlated to a user input. In some embodiments, the sensing layer 22 may be configured to sense characteristics or parameters that may be different from the characteristics sensed by the force sensing module 24. For example, the sensing layer 22 may include one or more capacitive sensors that may be configured to detect input touches, e.g., multi-touch input surface including intersecting rows and columns. The sensing layer 22 may be omitted where additional data regarding the user inputs may not be desired. Additionally, the sensing layer 22 may provide additional data that may be used to enhance data sensed by the force sensing module 24 or may be different from the force sensing module. In some embodiments, there may be an air gap between the sensing layer 22 and the force sensing module 24. In other words, the force sensing module 24 and sensing layer may be spatially separated from each other defining a gap or spacing distance.

The substrate 28 may be substantially any support surface, such as a portion of an printed circuit board, the enclosure 16 or frame, or the like. Additionally, the substrate 28 may be configured to surround or at least partially surround one more sides of the sensing device 18.

In some embodiments, a display (e.g., a liquid crystal display) may be positioned beneath the input surface 20 or may form a portion of the input surface 20. Alternatively, the display may be positioned between other layers of the force sensing device. In these embodiments, visual output provided by the display may be visible through the input surface 20.

Figure 3:
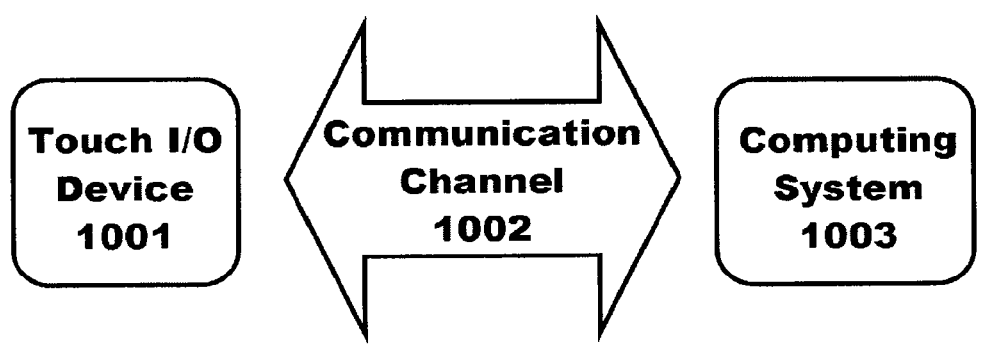
FIG. 3 shows a conceptual drawing of communication between a touch I/O device and a computing system.
Figure 4:
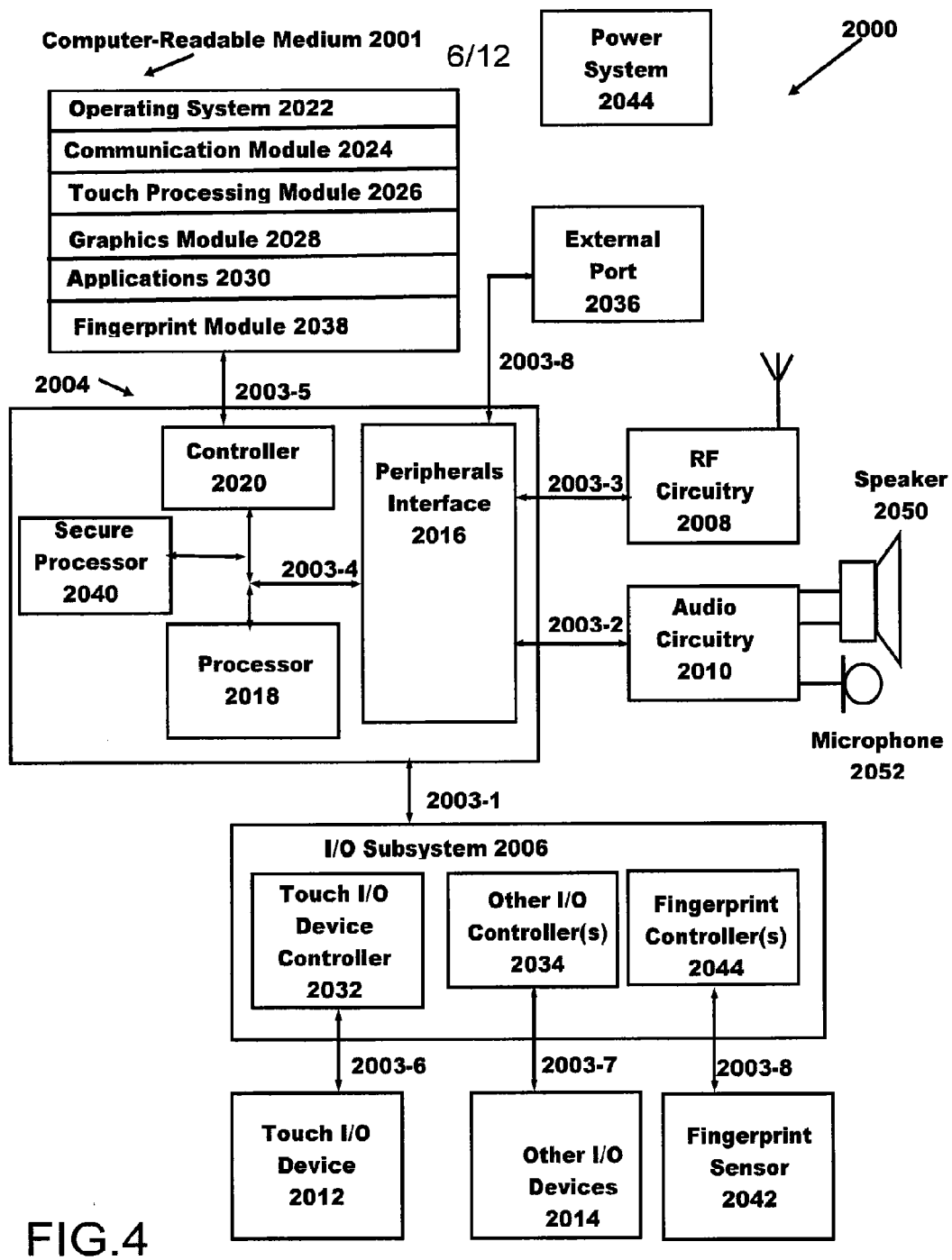
FIG. 4 shows a conceptual drawing of a system including a touch sensing and force sensing I/O device.

As generally discussed above, the force sensing device may be incorporated into one or more touch sensitive device. FIG. 3 shows a conceptual drawing of communication between a touch I/O device and a computing system. FIG. 4 shows a conceptual drawing of a system including a force sensitive touch device.

Described embodiments may include touch I/O device 1001 that can receive touch input and force input (such as possibly including touch locations and force of touch at those locations) for interacting with computing system 1003 (such as shown in the FIGS. 1A-1C) via wired or wireless communication channel 1002. Touch I/O device 1001 may be used to provide user input to computing system 1003 in lieu of or in combination with other input devices such as a keyboard, mouse, or possibly other devices. In alternative embodiments, touch I/O device 1001 may be used in conjunction with other input devices, such as in addition to or in lieu of a mouse, trackpad, or possibly another pointing device. One or more touch I/O devices 1001 may be used for providing user input to computing system 1003. Touch I/O device 1001 may be an integral part of computing system 1003 (e.g., touch screen on a laptop) or may be separate from computing system 1003.

Touch I/O device 1001 may include a touch sensitive and force sensitive panel which is wholly or partially transparent, semitransparent, non-transparent, opaque or any combination thereof. Touch I/O device 1001 may be embodied as a touch screen, touch pad, a touch screen functioning as a touch pad (e.g., a touch screen replacing the touchpad of a laptop), a touch screen or touchpad combined or incorporated with any other input device (e.g., a touch screen or touchpad disposed on a keyboard, disposed on a trackpad or other pointing device), any multi-dimensional object having a touch sensitive surface for receiving touch input, or another type of input device or input/output device.

In one example, touch I/O device 1001 embodied as a touch screen may include a transparent and/or semitransparent touch sensitive and force sensitive panel at least partially or wholly positioned over at least a portion of a display. (Although the touch sensitive and force sensitive panel is described as at least partially or wholly positioned over at least a portion of a display, in alternative embodiments, at least a portion of circuitry or other elements used in embodiments of the touch sensitive and force sensitive panel may be at least positioned partially or wholly positioned under at least a portion of a display, interleaved with circuits used with at least a portion of a display, or otherwise.) According to this embodiment, touch I/O device 1001 functions to display graphical data transmitted from computing system 1003 (and/or another source) and also functions to receive user input. In other embodiments, touch I/O device 1001 may be embodied as an integrated touch screen where touch sensitive and force sensitive components/devices are integral with display components/devices. In still other embodiments a touch screen may be used as a supplemental or additional display screen for displaying supplemental or the same graphical data as a primary display and to receive touch input, including possibly touch locations and force of touch at those locations.

Touch I/O device 1001 may be configured to detect the location of one or more touches or near touches on device 1001, and where applicable, force of those touches, based on capacitive, resistive, optical, acoustic, inductive, mechanical, chemical, or electromagnetic measurements, in lieu of or in combination or conjunction with any phenomena that can be measured with respect to the occurrences of the one or more touches or near touches, and where applicable, force of those touches, in proximity to deice 1001. Software, hardware, firmware or any combination thereof may be used to process the measurements of the detected touches, and where applicable, force of those touches, to identify and track one or more gestures. A gesture may correspond to stationary or non-stationary, single or multiple, touches or near touches, and where applicable, force of those touches, on touch I/O device 1001. A gesture may be performed by moving one or more fingers or other objects in a particular manner on touch I/O device 1001 such as tapping, pressing, rocking, scrubbing, twisting, changing orientation, pressing with varying pressure and the like at essentially the same time, contiguously, consecutively, or otherwise. A gesture may be characterized by, but is not limited to a pinching, sliding, swiping, rotating, flexing, dragging, tapping, pushing and/or releasing, or other motion between or with any other finger or fingers, or any other portion of the body or other object. A single gesture may be performed with one or more hands, or any other portion of the body or other object by one or more users, or any combination thereof.

Computing system 1003 may drive a display with graphical data to display a graphical user interface (GUI). The GUI may be configured to receive touch input, and where applicable, force of that touch input, via touch I/O device 1001. Embodied as a touch screen, touch I/O device 1001 may display the GUI. Alternatively, the GUI may be displayed on a display separate from touch I/O device 1001. The GUI may include graphical elements displayed at particular locations within the interface. Graphical elements may include but are not limited to a variety of displayed virtual input devices including virtual scroll wheels, a virtual keyboard, virtual knobs or dials, virtual buttons, virtual levers, any virtual UI, and the like. A user may perform gestures at one or more particular locations on touch I/O device 1001 which may be associated with the graphical elements of the GUI. In other embodiments, the user may perform gestures at one or more locations that are independent of the locations of graphical elements of the GUI. Gestures performed on touch I/O device 1001 may directly or indirectly manipulate, control, modify, move, actuate, initiate or generally affect graphical elements such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad generally provides indirect interaction. Gestures may also affect non-displayed GUI elements (e.g., causing user interfaces to appear) or may affect other actions within computing system 1003 (e.g., affect a state or mode of a GUI, application, or operating system). Gestures may or may not be performed on touch I/O device 1001 in conjunction with a displayed cursor. For instance, in the case in which gestures are performed on a touchpad, a cursor (or pointer) may be displayed on a display screen or touch screen and the cursor may be controlled via touch input, and where applicable, force of that touch input, on the touchpad to interact with graphical objects on the display screen. In other embodiments in which gestures are performed directly on a touch screen, a user may interact directly with objects on the touch screen, with or without a cursor or pointer being displayed on the touch screen.

Feedback may be provided to the user via communication channel 1002 in response to or based on the touch or near touches, and where applicable, force of those touches, on touch I/O device 1001. Feedback may be transmitted optically, mechanically, electrically, olfactory, acoustically, haptically, or the like or any combination thereof and in a variable or non-variable manner.

Attention is now directed towards embodiments of a system architecture that may be embodied within any portable or non-portable device including but not limited to a communication device (e.g. mobile phone, smart phone), a multi-media device (e.g., MP3 player, TV, radio), a portable or handheld computer (e.g., tablet, netbook, laptop), a desktop computer, an All-In-One desktop, a peripheral device, or any other (portable or non-portable) system or device adaptable to the inclusion of system architecture 2000, including combinations of two or more of these types of devices. FIG. 4 is a block diagram of one embodiment of system 2000 that generally includes one or more computer-readable mediums 2001, processing system 2004, Input/Output (I/O) subsystem 2006, electromagnetic frequency (EMF) circuitry (such as possibly radio frequency or other frequency circuitry) 2008 and audio circuitry 2010. These components may be coupled by one or more communication buses or signal lines 2003. Each such bus or signal line may be denoted in the form 2003-X, where X can be a unique number. The bus or signal line may carry data of the appropriate type between components; each bus or signal line may differ from other buses/lines, but may perform generally similar operations.

It should be apparent that the architecture shown in FIGS. 1A-4 is only one example architecture of system 2000, and that system 2000 could have more or fewer components than shown, or a different configuration of components. The various components shown in FIGS. 1A-4 can be implemented in hardware, software, firmware or any combination thereof, including one or more signal processing and/or application specific integrated circuits.

EMF circuitry 2008 is used to send and receive information over a wireless link or network to one or more other devices and includes well-known circuitry for performing this function. EMF circuitry 2008 and audio circuitry 2010 are coupled to processing system 2004 via peripherals interface 2016. Interface 2016 includes various known components for establishing and maintaining communication between peripherals and processing system 2004. Audio circuitry 2010 is coupled to audio speaker 2050 and microphone 2052 and includes known circuitry for processing voice signals received from interface 2016 to enable a user to communicate in real-time with other users. In some embodiments, audio circuitry 2010 includes a headphone jack (not shown).

Peripherals interface 2016 couples the input and output peripherals of the system to processor 2018 and computer-readable medium 2001. One or more processors 2018 communicate with one or more computer-readable mediums 2001 via controller 2020. Computer-readable medium 2001 can be any device or medium that can store code and/or data for use by one or more processors 2018. Medium 2001 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 2001 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

One or more processors 2018 run various software components stored in medium 2001 to perform various functions for system 2000. In some embodiments, the software components include operating system 2022, communication module (or set of instructions) 2024, touch and force-of-touch processing module (or set of instructions) 2026, graphics module (or set of instructions) 2028, one or more applications (or set of instructions) 2030, and fingerprint sensing module (or set of instructions) 2038. Each of these modules and above noted applications correspond to a set of instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments. In some embodiments, medium 2001 may store a subset of the modules and data structures identified above. Furthermore, medium 2001 may store additional modules and data structures not described above.

Operating system 2022 includes various procedures, sets of instructions, software components and/or drivers for controlling and managing general system tasks (e.g., memory management, storage device control, power management, etc.) and facilitates communication between various hardware and software components.

Communication module 2024 facilitates communication with other devices over one or more external ports 2036 or via EMF circuitry 2008 and includes various software components for handling data received from EMF circuitry 2008 and/or external port 2036.

Graphics module 2028 includes various known software components for rendering, animating and displaying graphical objects on a display surface. In embodiments in which touch I/O element 2012 is a touch sensitive and force sensitive display (e.g., touch screen), graphics module 2028 includes components for rendering, displaying, and animating objects on the touch sensitive and force sensitive display.

One or more applications 2030 can include any applications installed on system 2000, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system, also sometimes referred to herein as "GPS"), a music player, and otherwise.

Touch and force-of-touch processing module 2026 includes various software components for performing various tasks associated with touch I/O element 2012 including but not limited to receiving and processing touch input and force-of-touch input received from I/O device 2012 via touch I/O element controller 2032.

System 2000 may further include fingerprint sensing module 2038 for performing the method/functions as described herein in connection with other figures shown and described herein.

I/O subsystem 2006 is coupled to touch I/O element 2012 and one or more other I/O devices 2014 for controlling or performing various functions. Touch I/O element 2012 communicates with processing system 2004 via touch I/O element controller 2032, which includes various components for processing user touch input and force-of-touch input (e.g., scanning hardware). One or more other input controllers 2034 receives/sends electrical signals from/to other I/O devices 2014. Other I/O devices 2014 may include physical buttons, dials, slider switches, sticks, keyboards, touch pads, additional display screens, or any combination thereof.

If embodied as a touch screen, touch I/O element 2012 displays visual output to the user in a GUI. The visual output may include text, graphics, video, and any combination thereof. Some or all of the visual output may correspond to user-interface objects. Touch I/O element 2012 forms a touch-sensitive and force-sensitive surface that accepts touch input and force-of-touch input from the user. Touch I/O element 2012 and touch screen controller 2032 (along with any associated modules and/or sets of instructions in medium 2001) detects and tracks touches or near touches, and where applicable, force of those touches (and any movement or release of the touch, and any change in the force of the touch) on touch I/O element 2012 and converts the detected touch input and force-of-touch input into interaction with graphical objects, such as one or more user-interface objects. In the case in which device 2012 is embodied as a touch screen, the user can directly interact with graphical objects that are displayed on the touch screen. Alternatively, in the case in which device 2012 is embodied as a touch device other than a touch screen (e.g., a touch pad or trackpad), the user may indirectly interact with graphical objects that are displayed on a separate display screen embodied as I/O device 2014.

Touch I/O element 2012 may be analogous to the multi-touch sensitive surface described in the following U.S. Pat. Nos. 6,323,846; 6,570,557; and/or 6,677,932; and/or U.S. Patent Publication 2002/0015024A1, each of which is hereby incorporated by reference.

Embodiments in which touch I/O element 2012 is a touch screen, the touch screen may use LCD (liquid crystal display) technology, LPD (light emitting polymer display) technology, OLED (organic LED), or OEL (organic electro luminescence), although other display technologies may be used in other embodiments.

Feedback may be provided by touch I/O element 2012 based on the user's touch, and force-of-touch, input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

System 2000 also includes power system 2044 for powering the various hardware components and may include a power management system, one or more power sources, a recharging system, a power failure detection circuit, a power converter or inverter, a power status indicator and any other components typically associated with the generation, management and distribution of power in portable devices.

In some embodiments, peripherals interface 2016, one or more processors 2018, and memory controller 2020 may be implemented on a single chip, such as processing system 2004. In some other embodiments, they may be implemented on separate chips.

Ultrasound-Based Sensing with Separate Touch Modules

Although this application primarily describes particular embodiments with respect to configuration of the system including ultrasound-based sensing, in the context of the invention, there is no particular requirement for any limitation to those particular embodiments. While particular elements are described for layering of elements in one embodiment, alternative elements would also be workable.

For example, while this application primarily describes embodiments in which a set of ultrasound-based force sensing elements are disposed below a set of presentation elements and below a set of touch sensing elements, in alternative embodiments, there is no particular requirement for that ordering of elements. For example, the ultrasound-based force sensing elements could be disposed above the presentation elements and could be constructed or arranged so they do not interfere with the presentation elements, such as being translucent or transparent, or with the presentation elements disposed between individual force sensing elements.

For example, the ultrasound-based force sensing elements could be disposed above the presentation elements, but so arranged that the force sensing elements are interspersed with the presentation elements, with the effect that the presentation elements can present light and color to a user through the cover glass, without obstruction by any of the force sensing elements.

Figure 5A:
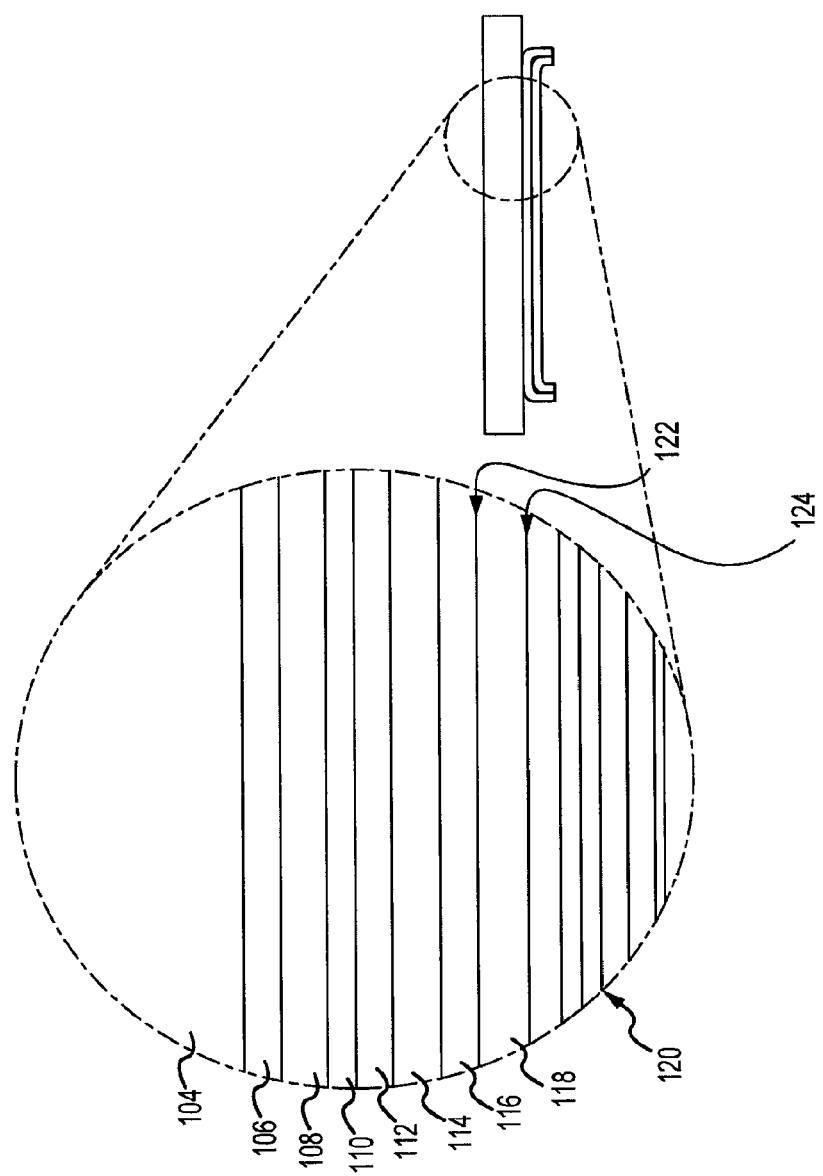
FIG. 5A shows a conceptual drawing of a system including ultrasound-based sensing with separate touch modules, including a liquid crystal display (LCD) construction option.

LCD CONSTRUCTION OPTION. FIG. 5A shows a conceptual drawing of a system including ultrasound-based sensing with separate touch modules, including a liquid crystal display (LCD) construction option 102.

A system including ultrasound-based sensing with separate touch modules includes a touch I/O element 2012 as described herein, including a cover glass (CG) element 104, which may be touched by the user, and for which touch may be sensed and force-of-touch may be sensed. An ultrasound-based force sensing element is disposed below the cover glass. A touch sensing element is also disposed below the cover glass.

In one embodiment, the touch I/O element 2012 can include a liquid crystal display (LCD) construction option.

In one embodiment, the liquid crystal display (LCD) construction option 102 can include the cover glass (CG) element 104, which can have a thickness of approximately 600 microns. The cover glass (CG) element 104 might be used to receive touch and force of touch from the user. The cover glass (CG) element 104 can be constructed using one or more layers of glass, chemically treated glass, sapphire, or one or more other substances.

In one embodiment, the liquid crystal display (LCD) construction option 102 can include a first optically clear adhesive (OCA) element 106 disposed below the cover glass element, which can have a thickness of approximately 150 microns. In alternative embodiments, other adhesive elements which do not interfere with operation of the other elements of the system could be used.

In one embodiment, the liquid crystal display (LCD) construction option 102 can include a top point of load (POL) element 108 disposed below the first optically clear adhesive (OCA) 106 element, which can have a thickness of approximately 200 microns. The top POL element might be used to distribute power to elements of the touch I/O element 2012.

In one embodiment, the liquid crystal display (LCD) construction option 102 can include a CF glass element 110 disposed below the top POL element 108, which, in some implementations can have a thickness of approximately 150 microns.

In one embodiment, the liquid crystal display (LCD) construction option 102 can include a thin film transistor (TFT) LCD glass element 112 disposed below the top POL element 108, which can have a thickness of approximately 150 microns. The TFT LCD element 112 might be used to present display elements for the touch I/O element 2012.

Although this application primarily describes an embodiment using a TFT element 112, which can have the capability of presenting an image to a user through the cover glass, in the context of the invention, many alternatives exist which would also be workable. In alternative embodiments, the TFT element 112 (in combination with the top POL element 108 and the bottom POL element 114) can be disposed in another location in a stack of elements disposed below the cover glass 104. For example, the TFT can be disposed below the touch sensor, which can in such cases be constructed of a transparent or translucent material, or otherwise disposed so that presentation of an image to a user can be performed.

Moreover, although this application primarily describes an embodiment using a TFT element 112 which is coupled to a top POL element 108 and a bottom POL element 114, in the context of the invention, many alternatives exist which would also be workable. In alternative embodiments, the TFT element 112 could be used with a single layer for signal distribution, such as a single layer which includes three electrodes for each TFT element, versus a top POL layer and a bottom POL layer, each of which includes two electrodes for each TFT element.

In one embodiment, the liquid crystal display (LCD) construction option can include a bottom POL element 114 disposed below the TFT LCD glass element 112, which can have a thickness of approximately 200 microns. Similar to the top POL element 108, the bottom POL 114 element might be used to distribute power to elements of the touch device 2012.

In one embodiment, the liquid crystal display (LCD) construction option 102 can include a second first optically clear adhesive (OCA) element 116 disposed below the bottom POL element 114, which can have a thickness of approximately 150 microns. As described above with respect to the first OCA element 106, in alternative embodiments, other adhesive elements which do not interfere with operation of the other elements of the system could be used.

In one embodiment, the liquid crystal display (LCD) construction option 102 can include an ultrasonic element 118, such as polyvinylidene difluoride (PVDF), disposed below the second first optically clear adhesive (OCA) element 116, which can have a thickness of approximately 50 microns.

Although this application primarily describes a system using a PVDF as the ultrasonic element 118, in alternative embodiments, any piezoelectric substance would also be workable, and is within the scope and spirit of the invention. Moreover, any other substance which could be excited to generate a sonic pulse, such as an ultrasonic pulse which can result in reflection from the an interface between the surface of the cover glass and either the air or the user's finger, would also be workable, and is within the scope and spirit of the invention. Moreover, any other substance which could be excited to generate a signal which can detect force of touch, such as a signal which could be absorbed, or alternatively, reflected, in response to a force of touch from a user's finger.

In one embodiment, the liquid crystal display (LCD) construction option 102 can include a set of backlight layers 120 disposed below the ultrasonic element 118. The backlight layers, in combination with the TFT LCD glass element 112, can provide the touch I/O element 2012 with a display capability.

In one embodiment, the liquid crystal display (LCD) construction option 102 can include a set of semi-transparent sense column circuits 122, disposed below the second first optically clear adhesive (OCA) element 106. For example, the semi-transparent sense column circuits 122 can include one or more metal layers or metallized layers, in which circuit elements are disposed. In one such example, the circuit elements are disposed in a set of horizontal and vertical wire elements, located so as not to cover the TFT LCD elements 112 (or other related display elements), with the effect that the circuits do not cause the lighted elements of the display to be substantially hindered or obscured. Similarly, in one embodiment, the liquid crystal display (LCD) construction option 102 can include a second of semi-transparent row driver circuits 124, disposed below the ultrasonic element 118. For example, the semi-transparent row driver circuits 124 can also include one or more metal layers or metallized layers, in which circuit elements are disposed. In one such example, the circuit elements are disposed in a set of horizontal and vertical wire elements, located so as not to cover the TFT LCD elements 112 (or other related display elements), with the effect that the circuits do not cause the lighted elements of the display to be substantially hindered or obscured. The sense column circuits 122 and the row driver circuits 124 are further described below.

As described above, while this application describes a particular ordering of layers, in alternative embodiments, other orderings would be workable, and are within the scope and spirit of the invention. Similarly, as described above, other substances other than OCA would be workable, and are within the scope and spirit of the invention. Similarly, as described above, other materials other than PVDF, such as other piezoelectric substances or other circuits or elements which could generate a signal capable of reflection from an interface between the surface of the cover glass and either the air or the user's finger, or otherwise detecting force of touch, would be workable, and are within the scope and spirit of the invention. Similarly, as described above, elements which are described to have a top and a bottom set of circuits for activation, would in alternative embodiments also be workable with only a single layer of circuits for activation, such as a single layer using three electrodes for activating individual elements, rather than two layers each having only two electrodes coupled to each element. Moreover, although certain thicknesses and other dimensions have been provided, it should be noted that these are meant as illustrative only. Many other thicknesses are envisioned and may be varied based on one or more design parameters, such as overall thickness of the device, cost, and so on.

Figure 5B:
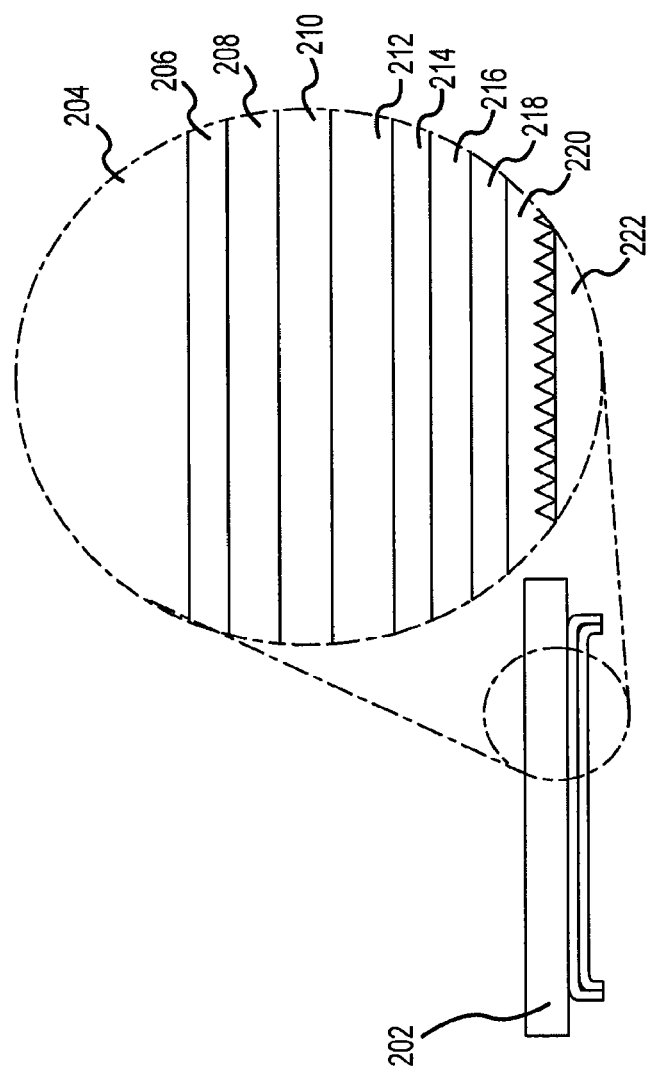
FIG. 5B shows a conceptual drawing of a system including ultrasound-based sensing with separate touch modules, including a plastic organic light-emitting diode (OLED) construction option.

PLASTIC OLED CONSTRUCTION OPTION. FIG. 5B shows a conceptual drawing of a system including ultrasound-based sensing with separate touch modules, including a plastic organic light-emitting diode (OLED) construction option 202.

A system including ultrasound-based sensing with separate touch modules includes a touch I/O element 2012 as described herein, including a cover glass (CG) element 204, which may be touched by the user, and for which touch may be sensed and force-of-touch may be sensed. An ultrasound-based force sensing element is disposed below the cover glass. A touch sensing element is also disposed below the cover glass.

In one embodiment, the touch I/O element 2012 can include a plastic organic light-emitting diode (OLED) construction option 202.

In one embodiment, the plastic organic light-emitting diode (OLED) construction option 202 can include the cover glass (CG) element 204, which can have a thickness of approximately 600 microns. The cover glass (CG) element 204 might be used to receive touch and force of touch from the user. The cover glass (CG) element 204 can be constructed using one or more layers of glass, chemically treated glass, sapphire, or one or more other substances.

In one embodiment, the plastic organic light-emitting diode (OLED) construction option 202 can include a first optically clear adhesive (OCA) element 206 disposed below the cover glass element 204, which can have a thickness of approximately 150 microns. In alternative embodiments, other adhesive elements which do not interfere with operation of the other elements of the system could be used.

In one embodiment, the plastic organic light-emitting diode (OLED) construction option 202 can include a plastic film dual indium-titanium oxide (DITO) element 208 disposed below the first optically clear adhesive (OCA) element 206, which had thickness of approximately 115 microns.

In one embodiment, the plastic organic light-emitting diode (OLED) construction option 202 can include a second optically clear adhesive (OCA) element 210 disposed below the plastic dual indium-titanium oxide (DITO) element 208, which can have a thickness of approximately 150 microns. As described above, in alternative embodiments, other adhesive elements which do not interfere with operation of the other elements of the system could be used.

In one embodiment, the plastic organic light-emitting diode (OLED) construction option 202 can include an OLED display element 212 disposed below the second optically clear adhesive (OCA) element. The OLED display element may be a plastic OLED and may have a thickness of approximately 250 microns. Although this application primarily describes an embodiment using a plastic OLED display element, which can have the capability of presenting an image to a user through the cover glass, in the context of the invention, many alternatives exist which would also be workable. In alternative embodiments, the plastic OLED display element (in combination with the DITO element) can be disposed in another location in a stack of elements disposed below the cover glass. For example, the plastic OLED display element can be disposed below the touch sensor, which can in such cases be constructed of a transparent or translucent material, or otherwise disposed so that presentation of an image to a user can be performed.

Moreover, although this application primarily describes an embodiment using a plastic OLED display element which is coupled to a DITO element, in the context of the invention, many alternatives exist which would also be workable. In alternative embodiments, the plastic OLED display element could be used with a single layer for signal distribution, such as a single layer which includes three electrodes for each plastic OLED display element, versus two layers for signal distribution, each of which includes two electrodes for each plastic OLED display element.

In one embodiment, the plastic organic light-emitting diode (OLED) construction option 202 can include an ultrasonic element 216. In some embodiments, the ultrasonic element may be polyvinylidene difluoride (PVDF). Additionally, the ultrasonic element may be disposed below the plastic OLED display element, which can have a thickness of approximately 50 microns.

In one embodiment, the plastic organic light-emitting diode (OLED) construction option can include a foam or rubber element 220 disposed below the ultrasonic element 216, and a mid-plate element 222 (such as a support element) disposed below the foam or rubber element 218.

In one embodiment, the plastic organic light-emitting diode (OLED) construction option can include a set of semi-transparent sense column circuits 214, disposed below the second optically clear adhesive (OCA) element 210. For example, the semi-transparent sense column circuits 214 can include one or more metal layers or metallized layers, in which circuit elements are disposed. In one such example, the circuit elements are disposed in a set of horizontal and vertical wire elements, located so as not to cover the OLED elements 212 (or other related display elements), with the effect that the circuits do not cause the lighted elements of the display to be substantially hindered or obscured. Similarly, in one embodiment, the plastic organic light-emitting diode (OLED) construction option 202 can include a second of semi-transparent row driver circuits 218, disposed below the ultrasonic element 216. For example, the semi-transparent row driver circuits 218 can include one or more metal layers or metallized layers, in which circuit elements are disposed. In one such example, the circuit elements are disposed in a set of horizontal and vertical wire elements, located so as not to cover the OLED elements 212 (or other related display elements), with the effect that the circuits do not cause the lighted elements of the display to be substantially hindered or obscured. The sense column circuits and the row driver circuits are further described below.

As described above, while this application describes a particular ordering of layers, in alternative embodiments, other orderings would be workable, and are within the scope and spirit of the invention. Similarly, as described above, other substances other than OCA would be workable, and are within the scope and spirit of the invention. Similarly, as described above, other materials other than PVDF, such as other piezoelectric substances or other circuits or elements which could generate a signal capable of reflection from an interface between the surface of the cover glass and either the air or the user's finger, or otherwise detecting force of touch, would be workable, and are within the scope and spirit of the invention. Similarly, as described above, elements which are described to have a top and a bottom set of circuits for activation, would in alternative embodiments also be workable with only a single layer of circuits for activation, such as a single layer using three electrodes for activating individual elements, rather than two layers each having only two electrodes coupled to each element.

Row and Column Circuits for Ultrasound-Based Sensing

Figure 6A:
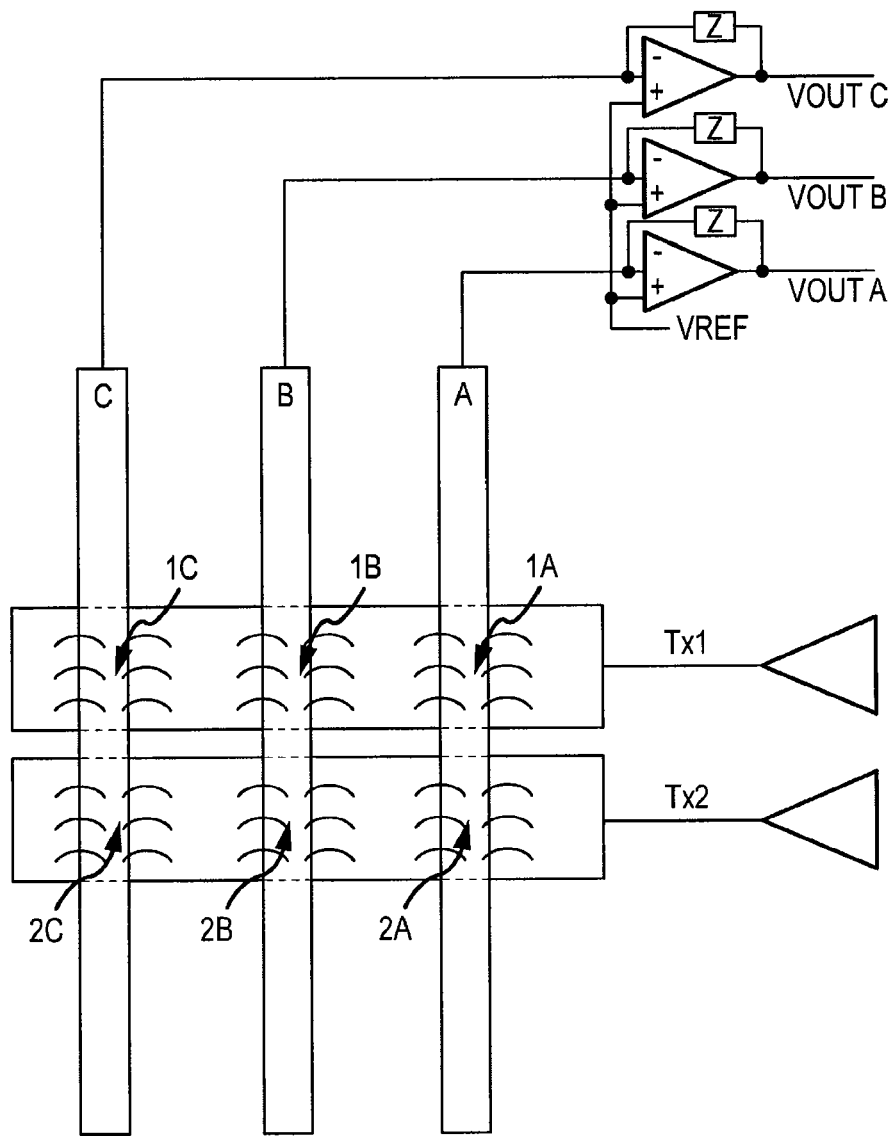
FIG. 6A shows a conceptual drawing of a system including ultrasound-based sensing with separate touch modules, including row drivers and sense columns.

FIG. 6A shows a conceptual drawing of a system including ultrasound-based sensing with separate touch modules, including row drivers and sense columns.

Figure 6B:
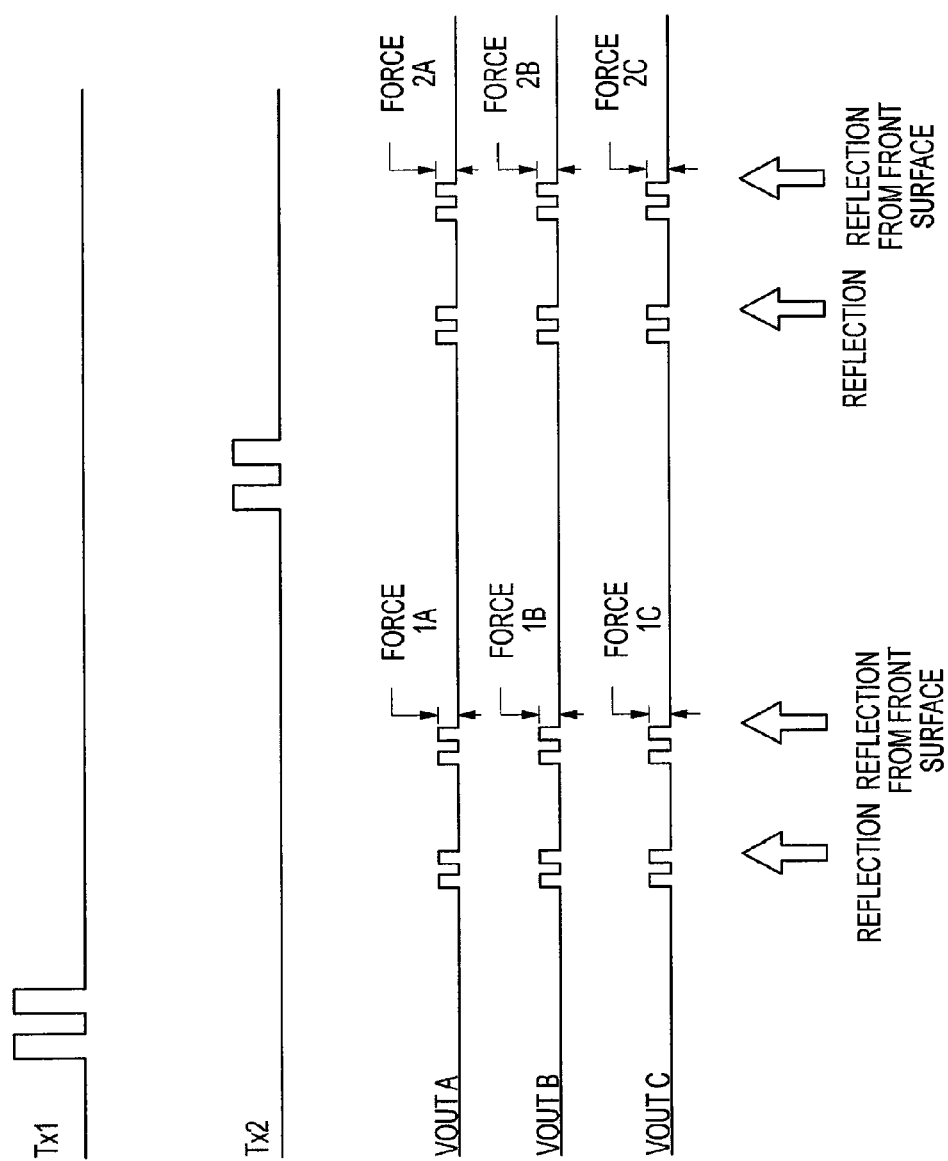
FIG. 6B shows a conceptual drawing of a system including ultrasound-based sensing with separate touch modules, including signals associated with row drivers and sense columns.

FIG. 6B shows a conceptual drawing of a system including ultrasound-based sensing with separate touch modules, including signals associated with row drivers and sense columns.

In one embodiment, the ultrasound-based sensing element includes one or more rows and one or more columns, disposed in an overlapping manner, such as rectilinearly, with the effect of identifying one or more force sensing elements at each intersection of a particular such row and a particular such column. This has the effect that force of touch can be determined independently at each particular one such force sensing element.

Similarly, in one embodiment, the touch sensing element includes one or more rows and one or more columns, disposed in an overlapping manner, such as rectilinearly, with the effect of identifying one or more touch sensing elements at each intersection of a particular such row and the particular such column. This has the effect that location of touch can be determined independently at each particular one such touch sensing element. In one embodiment, each touch sensing element includes a device capable of measuring a capacitance between the touch I/O element 2012 (or more particularly, and element below the cover glass of the touch device 2012) and the user's finger, or other body part or touching device. This has the effect that, when the user brings their finger near to or touching the touch I/O element 2012, one or more capacitance sense elements detect the location of the user's finger, and produce one or more signals indicating one or more locations at which the user is contacting the touch I/O element 2012.

In one embodiment, the ultrasound-based sensing elements have their rows coupled to one or more triggering and driving circuits (such as shown in the figure as TX1 and TX2, corresponding to rows 1 and 2, respectively), each of which is coupled to a corresponding row of the ultrasound-based sensing element. Each corresponding row of the ultrasound-based sensing element is coupled to a sequence of one or more ultrasound-based sensors. Each ultrasound-based sensor can, when triggered, emit an ultrasonic pulse or other signal (such as shown in the figure as TX1 and TX1, again corresponding to rows 1 and 2, respectively), which is transmitted from the ultrasound-based sensor, through the elements described with respect to the FIG. 3A or the FIG. 3B, and to the surface of the cover glass.

The triggering and driving circuits generate one or more pulses which are transmitted to the rows of the ultrasound-based sensing device, each of which is coupled to a corresponding row of individual ultrasound-based sensing elements. Similarly, in one embodiment, the individual ultrasound-based sensing elements have their columns coupled to one or more sensing and receiving circuits, each of which is coupled to a corresponding column of the ultrasound-based sensing device. Collectively, this has the effect that one or more rows of the ultrasound-based sensing device are driven by corresponding triggering signals, which are coupled to one or more columns of the ultrasound-based sensing device, which are sensed by corresponding receiving circuits.

When the ultrasonic pulse reaches the front surface of the cover glass, it would be reflected by the interface between the cover glass and the user's fingertip, or other part of the user's body, or other touching element (such as a soft-ended stylus or similar device). This can have the effect that the ultrasonic pulse would be reflected, at least in part, back to the ultrasound-based sensor which emitted that ultrasonic pulse. The reflected ultrasonic pulse is received by one or more ultrasound-based sensors, including the ultrasound-based sensor which emitted that ultrasonic pulse, with the effect that when the user touches the touch I/O element 2012, a signal is received which is responsive to the force of touch impressed on the cover glass by the user.

One or more such reflections from the interface between the front surface of the cover glass and either the air or the user's finger can be identified by the columns of the ultrasound-based sensing element (such as shown in the figure as Vout A, Vout B, and Vout C, corresponding to columns A, B, and C, respectively). Each such column is coupled to a sense amplifier, such as shown in the figure including a reference voltage Vref (such as a grounding voltage or other reference voltage), an amplifier, and a feedback impedance element (such as a capacitor, resistor, or combination or conjunction thereof, or otherwise). Although each sense amplifier is shown in the figure as coupled to only one sensing element, in the context of the invention, there is no particular requirement for any such limitation. For example, one or more such sense amplifiers can include a differential sense amplifier, or other sense amplifier design.

In one embodiment, each sense amplifier is disposed so that it generates a relatively maximal response in those cases when the ultrasonic reflection from the interface between the front of the cover glass and the user's finger is due to a force directly above the force sense element. This has the effect that when the force sense element receives a force of touch from the user, the relatively maximal response to that force of touch impressed on the cover glass by the user is primarily from the ultrasound-based sensing element at the individual row/column associated with the location where that force of touch is relatively maximal. To the extent that force of touch impressed on the cover glass by the user is also impressed on other locations on the cover glass, the ultrasound-based sensing element at the individual row/column associated with those other locations would also be responsive.

In one embodiment, each sense amplifier is also disposed so that it generates a relatively minimal response in those cases when the ultrasonic reflection from the interface between the front of the cover glass and the user's finger is due to a force from a location relatively far from directly above the force sense element. For example, in the case that the ultrasonic reflection is from a portion of the ultrasonic pulse which radiates at an angle from the ultrasound-based sensor, and is similarly reflected back at that angle, the arrival time of that ultrasonic pulse would be sufficiently different from a direct up-and-down reflection that the sense amplifier can be disposed to disregard that portion of the reflection of the ultrasonic pulse. This has the effect that the sense amplifier can be disposed to only respond to those cases when force of touch is impressed on the cover glass by the user directly above the sense amplifier.

For example, an ultrasonic pulse can be generated by a triggering pulse from driving circuit, such as TX1 or TX2, with the effect of providing a first set of (unwanted) reflections and a second set of (wanted) reflections, one set for each of Vout A, Vout B, and Vout C. The unwanted reflections might be responsive to reflections from other ultrasonic pulses, from ultrasonic pulses that are reflected from elements other than the interface between the front of the cover glass and either the air or the user's finger, or otherwise. For example, the unwanted reflections might occur at a time after the triggering pulse from driving circuit, such as less than about 450 nanoseconds after the triggering pulse, but before an expected time for the ultrasonic pulse to travel to the front of the cover glass and be reflected, such as more than about 450 nanoseconds after the triggering pulse. In such cases, the receiving and sensing circuits would be disposed to decline to respond to those reflections which are not within the expected window of time duration for a response from the correct force sensing element.

In one embodiment, the touch I/O element 2012 can include a capacitive touch sensing device, which can determine a location, or an approximate location, at which the user contacts, or nearly contacts, the touch I/O element 2012. For example, the capacitive touch sensing device can include a set of capacitive touch sensors, each of which is disposed to determine if the user contacts, or nearly contacts, the touch I/O element 2012 at one or more capacitive touch sensing elements.

In one embodiment, the touch I/O element 2012 can combine information from the capacitive touch sensing device and the ultrasound-based force sensing device, with the effect of determining both a location of touch and a force of touch by the user.

In one embodiment, the touch I/O element 2012 can maintain the ultrasound-based force sensing device in a relatively dormant state, with the effect of reducing ongoing power use, until such time as the capacitive touch sensing device indicates that there is a contact or near contact by the user on the touch I/O element 2012. For a first example, once there is a contact or near contact by the user on the touch I/O element 2012, the touch I/O element 2012 can activate the ultrasound-based force sensing device, with the effect that the ultrasound-based force sensing device need not draw power at times while the user is not contacting the touch I/O element 2012. For a second example, once there is a contact or near contact by the user on the touch I/O element 2012, the touch I/O element 2012 can activate a portion of the ultrasound-based force sensing device associated with the location where the contact or near contact occurs, with the effect that only those portions of the ultrasound-based force sensing device need draw power only at locations which are associated with places where the user is contacting the touch I/O element 2012.

Timing Diagram

Figure 7A:
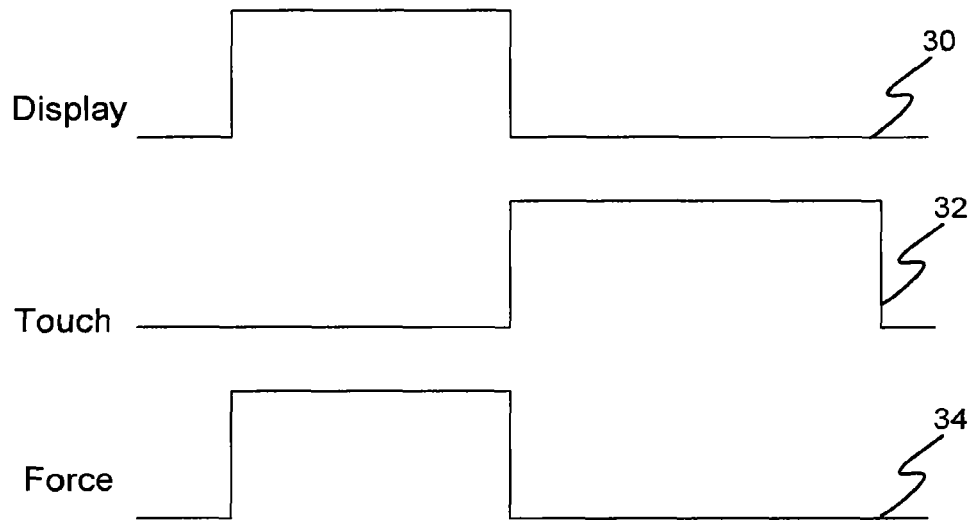
FIG. 7A is a first example of a timing diagram for the computing device.
Figure 7B:
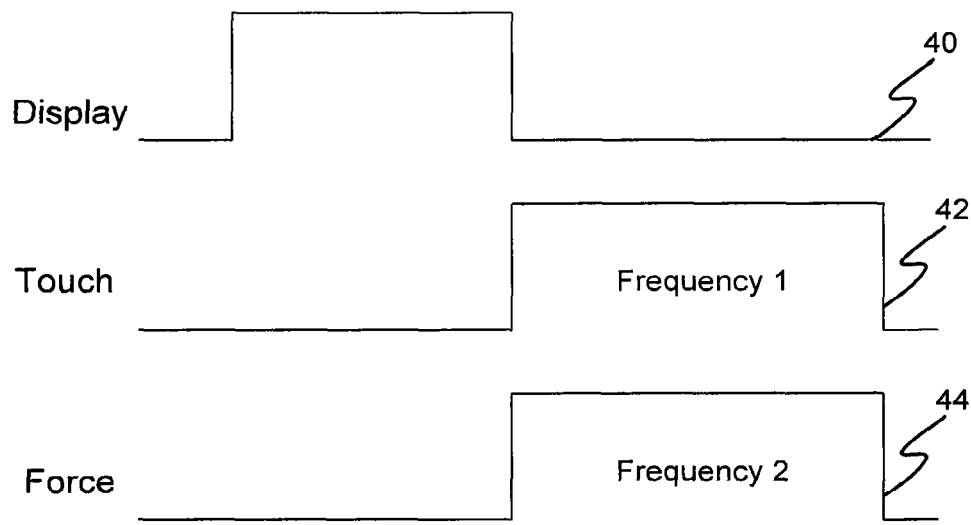
FIG. 7B is a second example of a timing diagram for the computing device.
Figure 7C:
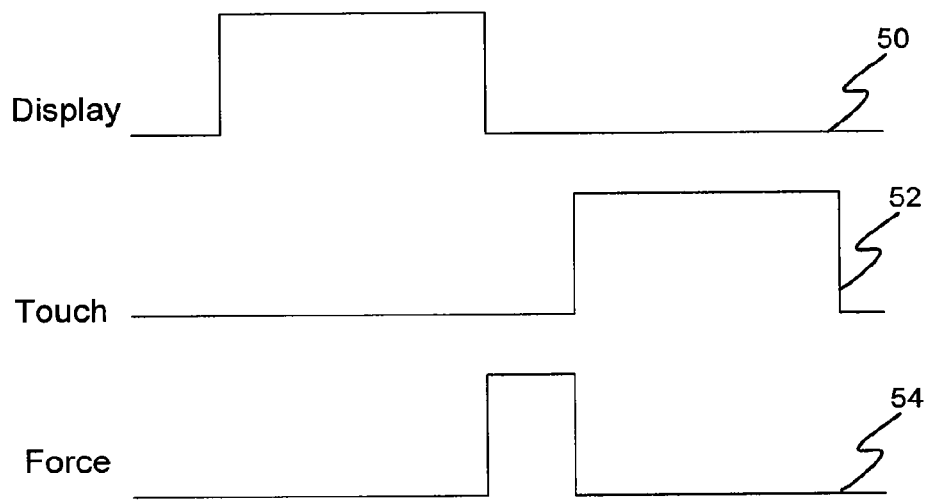
FIG. 7C is a third example of a timing diagram for the computing device.

In some embodiments various components of the computing device and/or touch screen device may be driven or activated separately from each other and/or on separate frequencies. Separate drive times and/or frequencies for certain components, such as the display, touch sensor or sensors (if any), and/or force sensors may help to reduce cross-talk and noise in various components. FIGS. 7A-7C illustrate different timing diagram examples, each will be discussed in turn below. It should be noted that the timing diagrams discussed herein are meant as illustrative only and many other timing diagrams and driving schemes are envisioned.

With respect to FIG. 7A, in some embodiments, the display 14 and the force sensor 18 may be driven substantially simultaneously, with the touch sensitive component 1001 being driven separately. In other words, the driver circuits for the force sensing device 18 may be activated during a time period that the display is also activated. For example, the display signal 30 and the force sensing signal 34 may both be on during a first time period and then may both inactive as the touch sensing device signal 32 is activated.

With respect to FIG. 7B, in some embodiments, the touch and force devices may be driven at substantially the same time and the display may be driven separately. For example, the display signal 40 may be set high (e.g., active) during a time that the touch signal 42 and the force signal 44 may both be low (e.g., inactive), and the display signal 40 may be low while both the touch signal 42 and the force signal 44 are high. In this example, the touch signal 42 and the force signal 44 may have different frequencies. In particular, the touch signal 42 may have a first frequency F1 and the force signal 44 may have a second frequency F2. By utilizing separate frequencies F1 and F2, the computing device may be able to sample both touch inputs and force inputs at substantially the same time without one interfering with the other, which in turn may allow the processor to better correlate the touch inputs and the force inputs. In other words, the processor may be able to correlate a force input to a touch input because the sensors may be sampling at substantially the same time as one another. Additionally, the separate frequencies may reduce noise and cross-talk between the two sensors. Although the example in FIG. 7B is discussed with respect to the force and touch signals, in other embodiments each of the drive signal, the touch signal, and/or the force signal may have separate frequencies from each other and may be activated simultaneously or correspondingly with another signal.

With respect to FIG. 7C, in some embodiments, various components in the computing device may be driven separately from one another. For example, the display signal 50 may be driven high, while both the touch signal 52 and the force signal 54 are low. Additionally, the touch signal 52 may be high while both the force signal 54 and the display signal 50 are low and similarly the force signal 54 may be high while both the display signal 50 and the touch signal 52 are low. In these examples, the force signal's active period may be positioned between the active periods of the display and the touch sensor. In other words, the force sensor 18 may be driven between the display being driven and the touch sensors being driven. In these examples, each of the devices may be active at separate times from one another, thereby reducing inter-system noise. In some embodiments, the force sensor may have a shorter drive time than the display or touch signals; however, in other embodiments, the force sensor may have a drive time that is substantially the same as or longer than the display and/or touch sensor.

Alternative Embodiments

After reading this application, those skilled in the art would recognize that techniques for performing ultrasonic-based force sensing and touch sensing, particularly in a touch device, and using information gleaned from or associated with ultrasonic-based force sensing and touch sensing to perform methods associated with touch recognition, touch elements of a GUI, and touch input or manipulation in an application program, are each responsive to, and transformative of, real-world events, and real-world data associated with those events, such as force sensing data and touch sensing data received from a user's touch activity, and provides a useful and tangible result in the service of operating a touch device. Moreover, after reading this application, those skilled in the art would recognize that processing of force sensing data and touch sensing data by a computing device includes substantial computer control and programming, involves substantial records of force sensing data and touch sensing data, and involves interaction with force sensing hardware and touch sensing hardware and optionally a user interface for using force sensing information and touch sensing information.

Certain aspects of the embodiments described in the present disclosure may be provided as a computer program product, or software, that may include, for example, a computer-readable storage medium or a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular embodiments. Functionality may be separated or combined in procedures differently in various embodiments of the disclosure or described with different terminology. These and other variations, modifications, additions, and improvements may fall within the scope of the disclosure as defined in the claims that follow.

What is claimed is:

1. A touch I/O device, including
one or more touch sensors capable of providing touch location information, the touch location information including one or more locations at which a contact or near-contact occurs;
one or more ultrasonic force sensors capable of providing force of touch information, the force of touch information including a measure of an amount of force presented at the one or more locations at which a contact or near-contact occurs, wherein the one or more ultrasonic force sensors are separate from the one or more touch sensors;
one or more drive circuits coupled to the touch sensors and to the ultrasonic force sensors, the one or more drive circuits configured to drive the touch sensors at a first time and at a first frequency and configured to drive the ultrasonic force sensors at least one of at a second different time or at a second different frequency;
one or more sense circuits coupled to the touch sensors and to the ultrasonic force sensors, and capable of combining information from the touch sensors and from the ultrasonic force sensors.

2. The touch I/O device as in claim 1, wherein
the ultrasonic force sensors are disposed in a pattern, the pattern including a plurality of first ultrasonic force sensor nodes and a plurality of second ultrasonic force sensor nodes, a set of intersections of the first ultrasonic force sensor nodes and the second ultrasonic force sensor nodes defining one or more locations where the ultrasonic force sensors are capable of providing touch location information.

3. The touch I/O device as in claim 2, wherein
the pattern of the ultrasonic force sensors is substantially rectilinear.

4. The touch I/O device as in claim 1, wherein
the ultrasonic force sensors are disposed in a pattern, the pattern including a plurality of first ultrasonic force sensor nodes and a plurality of second ultrasonic force sensor nodes;
a coupling of a particular one of the first ultrasonic force sensor nodes and a particular one of the second ultrasonic force sensor nodes designates one or more locations where the force sensors are capable of providing force of touch information; and
the coupling of a particular one of the first ultrasonic force sensor nodes and a particular one of the second ultrasonic force sensor nodes provides a circuit, the circuit providing an ultrasonic signal, the ultrasonic signal being responsive to a measure of force of touch.

5. The touch I/O device as in claim 1, wherein
the touch sensors are disposed in a pattern, the pattern including a plurality of first touch sensor nodes and a plurality of second touch sensor nodes, a set of intersections of the first touch sensor nodes and the second touch sensor nodes defining one or more locations where the touch sensors are capable of providing touch location information.

6. The touch I/O device as in claim 5, wherein
the pattern of the touch sensors is substantially rectilinear.

7. The touch I/O device as in claim 1, wherein
the touch sensors are disposed in a pattern, the pattern including a plurality of first touch sensor nodes and a plurality of second touch sensor nodes, a set of intersections of the first touch sensor nodes and the second touch sensor nodes defining one or more locations where the touch sensors are capable of providing touch location information;
the ultrasonic force sensors are disposed in a pattern, the pattern including a plurality of first ultrasonic force sensor nodes and a plurality of second ultrasonic force sensor nodes, a set of intersections of the first ultrasonic force sensor nodes and the second ultrasonic force sensor nodes defining one or more locations where the ultrasonic force sensors are capable of providing touch location information; and
at least one of the first touch sensor nodes and the first ultrasonic force sensor nodes are coupled to at least one of the second touch sensor nodes and the second ultrasonic force sensor nodes.

8. The touch I/O device as in claim 7, wherein
the pattern of the touch sensors and the pattern of the ultrasonic force sensors substantially overlap.

9. The touch I/O device as in claim 1, wherein
the touch sensors include one or more capacitive touch sensors disposed in a pattern, the pattern including a plurality of first touch sensor nodes and a plurality of second touch sensor nodes;
a coupling of a particular one of the first touch sensor nodes and a particular one of the second touch sensor nodes designates one or more locations where the touch sensors are capable of providing touch location information; and
the coupling of a particular one of the first touch sensor nodes and a particular one of the second touch sensor nodes provides a circuit, the circuit being responsive to a measure of capacitance responsive to a contact or near-contact.

10. The touch I/O device as in claim 1, wherein
a measure of reflection of a signal generated by at least one ultrasonic force sensor at a designated time indicates force of touch information.

11. A method, including operations of:
driving one or more touch sensors at a first time and a first frequency;
driving one or more ultrasonic force sensors at a second time and a second frequency, wherein at least one of the second time does not overlap with the first time or the second frequency is distinct from the first frequency;

providing touch location information in response to the one or more touch sensors, the touch location information including one or more locations at which a contact or near-contact occurs;

providing force of touch information in response to the one or more ultrasonic force sensors, the force of touch information including a measure of an amount of force presented at the one or more locations at which a contact or near-contact occurs;

providing the signals at discernible times in response to whether the signals are in response to contact or in response to an amount of force; and combining information from the touch sensors and from the ultrasonic force sensors; wherein the one or more ultrasonic force sensors is discrete from the one or more touch sensors.

12. The method as in claim 11, including operations of:
disposing the ultrasonic force sensors in a pattern including a plurality of first ultrasonic force sensor nodes and a plurality of second ultrasonic force sensor nodes; and defining one or more locations where the ultrasonic force sensors are capable of providing force location information at a set of intersections of the first ultrasonic force sensor nodes and the second ultrasonic force sensor nodes.

13. The method as in claim 12, wherein
the pattern of the ultrasonic force sensors is substantially rectilinear.

14. The method as in claim 11, including operations of:
disposing the touch sensors in a pattern, the pattern including a plurality of first touch sensor nodes and a plurality of second touch sensor nodes; and defining one or more locations where the touch sensors are capable of providing touch location information at a set of intersections of the first touch sensor nodes and the second touch sensor nodes.

15. The method as in claim 14, wherein
the pattern of the touch sensors is substantially rectilinear.

16. The method as in claim 11, including operations of:
disposing the touch sensors in a pattern, the pattern including a plurality of first touch sensor nodes and a plurality of second touch sensor nodes;

defining one or more locations where the touch sensors are capable of providing touch location information at a set of intersections of the first touch sensor nodes and the second touch sensor nodes;

disposing the ultrasonic force sensors in a pattern, the pattern including a plurality of first ultrasonic force sensor nodes and a plurality of second ultrasonic force sensor nodes;

defining one or more locations where the ultrasonic force sensors are capable of providing force location information at a set of intersections of the first ultrasonic force sensor nodes and the second ultrasonic force sensor nodes; and coupling at least one of the first touch sensor nodes and the first ultrasonic force sensor nodes to at least one of the second touch sensor nodes and the second ultrasonic force sensor nodes.

17. The method as in claim 16, wherein
the pattern of the touch sensors and the pattern of the ultrasonic force sensors substantially overlap.

18. The method as in claim 12, including operations of:
disposing ultrasound generators and receivers at one or more locations where the ultrasonic force sensors are disposed;

coupling a particular one of the ultrasonic first force sensor nodes and a particular one of the second ultrasonic force sensor nodes at an intersection thereof;

providing a circuit at one or more locations where the ultrasonic force sensors are capable of providing force of touch information; and the circuit providing an ultrasonic signal, the ultrasonic signal being responsive to a measure of force of touch.

19. The method as in claim 11, wherein
a measure of reflection of the force sensors at a designated time indicates force of touch information.

20. The method as in claim 14, wherein
the touch sensors include one or more capacitive touch sensors, wherein a coupling of a particular one of the first touch sensor nodes and a particular one of the second touch sensor nodes designates one or more locations where the touch sensors are capable of providing touch location information;

the coupling of a particular one of the first touch sensor nodes and a particular one of the second touch sensor nodes providing a circuit, the circuit being responsive to a measure of capacitance responsive to a contact or near-contact.

* * * * *